United States Patent
Bayer

(10) Patent No.: US 6,383,281 B2
(45) Date of Patent: May 7, 2002

(54) MOLDING COMPOSITION FOR PRODUCING POWDER METALLURGICAL OR CERAMIC PRODUCTS

(75) Inventor: Michael Bayer, Thierhaupten (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/738,616

(22) Filed: Dec. 15, 2000

(30) Foreign Application Priority Data

Dec. 17, 1999 (DE) .......................... 199 60 991

(51) Int. Cl.$^7$ ............................... C08L 91/06
(52) U.S. Cl. .................... 106/272; 585/2; 264/319; 264/669; 419/66; 419/68
(58) Field of Search ............... 106/272; 585/2, 585/9; 264/669, 319; 419/66, 68

(56) References Cited

U.S. PATENT DOCUMENTS

| | | | | |
|---|---|---|---|---|
| 5,264,681 A | * | 11/1993 | Nozaki et al. | ............... 219/544 |
| 5,723,705 A | | 3/1998 | Herrmann et al. | |
| 5,817,897 A | * | 10/1998 | Itou | ............................. 585/9 |
| 6,221,289 B1 | * | 4/2001 | Corbett et al. | ................. 264/44 |

FOREIGN PATENT DOCUMENTS

| | | |
|---|---|---|
| EP | 0 571 882 | 12/1993 |
| EP | 0 632 063 | 1/1995 |
| WO | WO 97/41158 | 11/1997 |
| WO | WO 98/05453 | 2/1998 |
| WO | WO 99/11406 | 3/1999 |
| WO | WO 99/28067 | 6/1999 |

OTHER PUBLICATIONS

Derwent Patent Family Abstract for WO 97/41158.

* cited by examiner

Primary Examiner—Christopher A. Fiorilla
(74) Attorney, Agent, or Firm—Anthony A. Bisulca

(57) ABSTRACT

The present invention relates to a molding composition based on sinterable materials, comprising
 a) from 80 to 99.5% by weight of sinterable powder having a maximum particle size of 2000 μm,
 b) from 0.5 to 20% by weight of metallocene polyolefin wax,
 c) if desired, up to 19.5% by weight of a further dry lubricant,
and to its use for producing shaped ceramic and powder metallurgical parts by pressing.

5 Claims, No Drawings

MOLDING COMPOSITION FOR PRODUCING POWDER METALLURGICAL OR CERAMIC PRODUCTS

CROSS-REFERENCES TO RELATED APPLICATIONS

The present invention is described in the German priority application No. 19 960 991.8, filed Dec. 17, 1999, which is hereby incorporated by reference as is fully disclosed herein.

BACKGROUND OF THE INVENTION

The invention relates to a powder metallurgical or ceramic molding composition which is shaped by dry pressing and which has been produced and processed using a lubricant based on metallocene polyolefin wax.

The starting material for powder metallurgical or ceramic products is a metal or ceramic powder which is free-flowing and is mixed with a pulverized lubricant. This lubricant-containing mixture is introduced into a pressing mold and is pressed axially or isostatically to form a shaped body. After the shaped body has been freed of lubricant by means of a thermal process, known as binder removal, the powder compact is sintered to give the sintered component.

Fatty acids or metal salts of these fatty acids, for instance zinc stearate or lithium stearate as described in WO-A-98/05453, can be used to produce powder molding compositions and process them powder metallurgically. The lubricant action, in particular, of these products is very good. However, the pyrolysis behavior of these materials is a drawback. On thermal decomposition, metallic or oxidic residues remain in the furnace or in/on the sintered component. This results in increased cleaning costs or impairs the quality of the sintered product.

It is possible to use amide waxes which leave no residue and have a satisfactory lubricant action. However, the use of amide waxes has an adverse effect on the flowability of the powder/lubricant mixture. Their use is restricted to use under cold conditions, i.e. at temperatures of less than 100° C.

WO-A-99/28067 proposes the use of polyesters as lubricants. However, the usability of these dry lubricants is only satisfactory above 100° C. and has to be improved by means of lubricants such as zinc stearate or amide wax.

WO-A-99/11406 describes the use of olefin polymers having an $M_w$ of 500–10,000.

SUMMARY OF THE INVENTION

However, it has been found that the specified lubricants have, in particular because of their viscosity behavior, disadvantages, particularly in hot pressing. This leads to a deterioration in the flowability of the powder/lubricant mixture at temperatures above 100° C. This results in an adverse effect on the bulk density on filling the molds and, associated therewith, a deterioration in the subsequent compaction process.

It has surprisingly been found that polyolefin waxes prepared using metallocene catalysts ("metallocene polyolefin waxes") are particularly suitable as dry lubricants in powder metallurgical and ceramic molding compositions. In addition, it has been found that polyolefin waxes prepared using metallocene catalysts and having a melting point of 80–120° C. are particularly suitable for cold pressing, while polyolefin waxes prepared using metallocene catalysts and having a melting point of 100–165° C. are particularly useful for hot pressing.

DESCRIPTION OF THE PREFERRED EMBODIMENTS

The present invention accordingly provides a molding composition based on sinterable materials, comprising
  a) from 80 to 99.5% by weight of sinterable powder having a maximum particle size of 2000 µm,
  b) from 0.5 to 20% by weight of metallocene polyolefin wax,
  c) if desired, up to 19.5% by weight of a further dry lubricant.

The molding composition of the invention comprises sinterable materials in the form of nonmetallic inorganic powders or metallic powders. These include powders based on porcelain, zirconium silicate, metal oxides, metal nitrides and metal carbides.

Metallic powders which can be used for the purposes of the invention are powders based on compounds of iron, tungsten, copper, bronze, molybdenum, chromium or nickel. The maximum particle size of the powders is preferably 1000 µm. The molding composition preferably comprises 85–99% by weight of the sinterable materials.

The molding composition of the invention further comprises a metallocene polyolefin wax as dry lubricant. This metallocene polyolefin wax preferably has the following properties:
  Drop point (d.p.): 80–165° C.
  Acid number (AN): 0–50 mg KOH/g
  Density: 0.87–1.03 g/cm$^3$
  Viscosity of the melt at 170° C.: 10–100,000 mPas.

The molding composition preferably contains 1–15% by weight of metallocene waxes.

Possible polyolefin waxes are homopolymers of ethylene or propylene or copolymers of ethylene or propylene with one another or with one or more 1-olefins. 1-Olefins used are linear or branched olefins having 4–18 carbon atoms, preferably 4–6 carbon atoms. These olefins can have an aromatic substituent conjugated to the olefinic double bond. Examples are 1-butene, 1-hexene, 1-octene or 1-octadecene, and also styrene. Preference is given to copolymers of ethylene with propene or 1-butene. The copolymers comprise 70–99.9% by weight, preferably 80–99% by weight, of ethylene.

Particularly well-suited polyolefin waxes are those having a drop point of from 90 to 160° C., preferably from 100 to 155° C., a melt viscosity at 140° C. of from 10 to 10,000 mPa·s, preferably from 50 to 5000 mPa·s, and a density at 20° C. of from 0.89 to 0.96 g/cm$^3$, preferably from 0.91 to 0.94 g/cm$^3$.

Metallocene catalysts for preparing the polyolefin waxes are chiral or nonchiral transition metal compounds of the formula $M^1L_x$. The transition metal compound $M^1L_x$ comprises at least one central metal atom $M^1$ to which at least one π ligand, e.g. a cyclopentadienyl ligand, is bound. In addition, substituents such as halogen atoms or alkyl, alkoxy or aryl groups may be bound to the central metal atom $M^1$. $M^1$ is preferably an element of main group III, IV, V or VI of the Periodic Table of the Elements, e.g. Ti, Zr or Hf. For the purposes of the present invention, cyclopentadienyl ligands are unsubstituted cyclopentadienyl radicals and substituted cyclopentadienyl radicals such as methylcyclopentadienyl, indenyl, 2-methylindenyl, 2-methyl-4-phenylindenyl, tetrahydroindenyl or octahydrofluorenyl radicals. These π ligands can be bridged or unbridged, with simple and multiple bridges, including bridges via ring systems, being possible. The term metallocene also encompasses compounds having more than one metallocene fragment, known as multinuclear metallocenes. These can have any substitution pattern and bridging variants. The individual metallocene fragments of such multinuclear metallocenes can be either identical to or different from one another. Examples of such multinuclear metallocenes are described, for example, in EP-A-0 632 063. Examples of general structural formulae of metallocenes and of their activation using a cocatalyst are given in, for example, EP-A-0 571 882. Further suitable waxes are metallocene waxes which have been modified by oxidation, as can be obtained, for example, by treating the wax melt with air as described in EP-A-0 896 591. The relevant disclosures in these three documents are hereby incorporated by reference.

The molding composition of the invention may comprise an additional dry lubricant. These are preferably metal salts of fatty acids or amide waxes, e.g. lithium stearate, calcium stearate or zinc stearate or amide waxes of the ethylenebis (stearoylamide) or stearoylamide type.

The production and processing of the molding composition of the invention generally takes place in the following manner:

1. Mixing: The sinterable powders are mixed at temperatures of from 10 to 150° C. in a mixer with the polyolefin wax which has been pulverized by milling or melt spraying, until a homogeneous, free-flowing molding composition has been obtained.

2. Pressing: The molding composition obtained from 1., which is at from 20 to 160° C., is placed in molds which are at temperatures of from 20 to 160° C. and the molding composition is shaped at pressures of up to 700 MPa to give a shaped part.

3. Binder removal: The shaped part obtained from 2. is slowly heated up to a temperature of 600° C. in a suitable gas atmosphere in order to remove the metallocene polyolefin wax by pyrolysis.

4. Sintering: The shaped part from which the binder has been removed is, preferably in the same furnace, sintered at a material-specific sintering temperature.

The invention further provides for the use of the molding composition of the invention for producing shaped ceramic and powder metallurgical parts by pressing.

EXAMPLES

The following examples illustrate the invention:

Example 1

0.8 part by weight of a metallocene ethylene-propylene copolymer wax (d.p.: 110° C., AN: 20 mg KOH/g, viscosity: 2000 mPa·s at 170° C.) was comminuted to a particle size of <60 $\mu$m and a mean particle diameter of 20 $\mu$m and mixed with 99.2 parts by weight of iron powder ASC 100.29 (manufacturer: Höganäs AB) at room temperature for 15 minutes. The mixture obtained had a trickle rate of 30 s/50 g (measured using a flow meter in accordance with the steel/iron testing procedure) and a bulk density of 2.95 g/cm$^3$. Cylinders having dimensions of 11.2×20 mm were cold-pressed at a pressure of 600 MPa. The pressed density was 7.20 g/cm$^3$. After binder removal in flowing hydrogen, the cylinders were sintered at 1120° C. in hydrogen for 30 minutes to give a density of 7.45 g/cm$^3$.

Example 2

1 part by weight of a metallocene polypropylene wax (d.p.: 160° C., AN: 0 mg KOH/g, viscosity: 3500 mPa·s at 170° C.) was comminuted to a particle size of <60 $\mu$m and a mean particle diameter of 20 $\mu$m and mixed with 99 parts by weight of iron powder ASC 100.29 (manufacturer: Höganäs AB) at 130° C. for 15 minutes. The mixture obtained was placed in a mold heated to 150° C. and hot-pressed at a pressure of 600 MPa. The pressed density of the 11.2×20 mm cylinders produced was 7.30 g/cm$^3$. The cylinders were subjected to binder removal in flowing hydrogen at up to 600° C. and subsequently sintered at 1120° C. in hydrogen for 30 minutes to give a density of 7.50 g/cm$^3$.

Example 3

5 parts by weight of an oxidized metallocene polyethylene wax (d.p.: 110°; AN: 15 mg KOH/g, viscosity: 3000 mPa·s at 170° C.) were comminuted to a particle size of 150–450 $\mu$m and mixed with 95 parts by weight of a ceramically bound alumina powder having a particle size of 800–1500 $\mu$m and pressed at 200 MPa at room temperature to form cylinders. The density of the cylinders was 2.6 g/cm$^3$. The green strength was 3 N/mm$^2$. The cylinders were subjected to binder removal in air and subsequently fired at 1000° C. to give porous bodies having a density of 3.1 g/cm$^3$.

What is claimed is:

1. A molding composition based on sinterable materials, comprising
   a) from 80 to 99.5% by weight of sinterable powder having a maximum particle size of 2000 $\mu$m,
   b) from 0.5 to 20% by weight of metallocene polyolefin wax,
   c) if desired, up to 19.5% by weight of a further dry lubricant.

2. A molding composition as claimed in claim 1 comprising from 85 to 99% by weight of constituent a).

3. A molding composition as claimed in claim 1 comprising from 1 to 15% by weight of constituent b).

4. A molding composition as claimed in claim 1 comprising a metal salt of a fatty acid or an amide wax as constituent c).

5. A shaped ceramic comprising the molding composition as claimed in claim 1.

* * * * *